Aug. 7, 1945.   S. F. HUNT   2,381,751
CARBURETOR
Filed Dec. 16, 1932
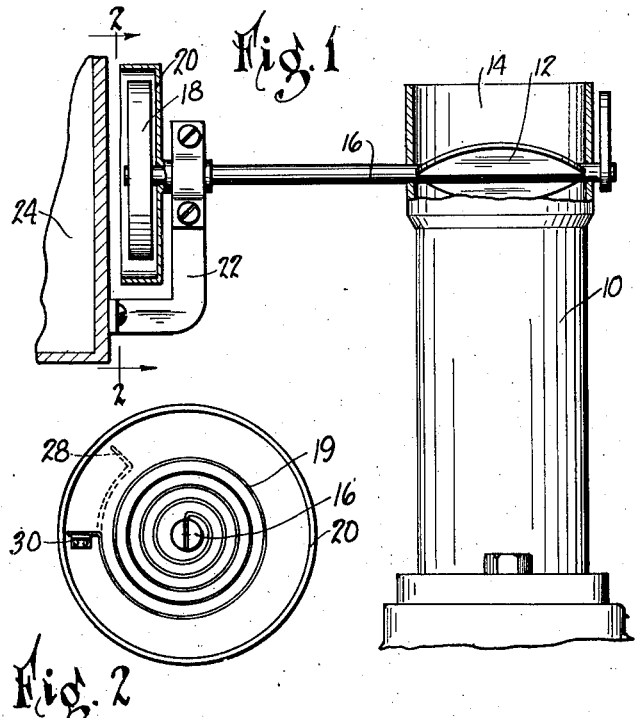
Fig. 1
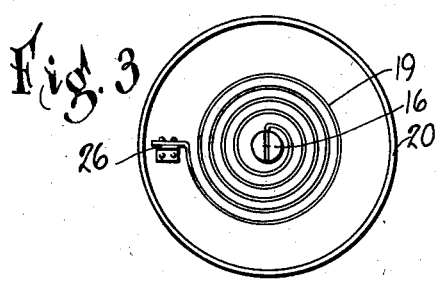
Fig. 2
Fig. 3
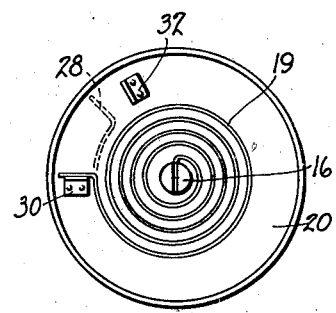
Fig. 4
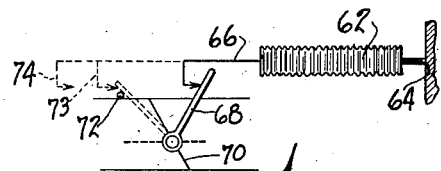
Fig. 6
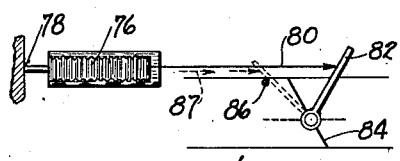
Fig. 7
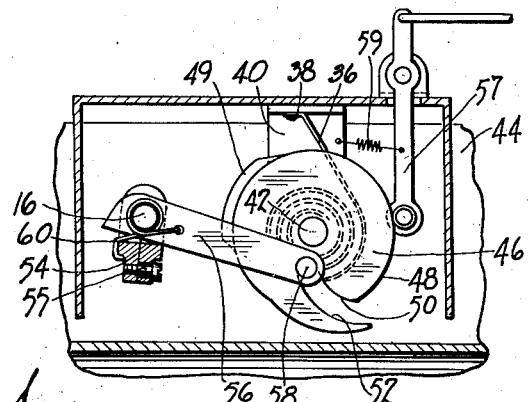
Fig. 5
INVENTOR.
Scott F. Hunt
BY
ATTORNEY.

Patented Aug. 7, 1945

2,381,751

UNITED STATES PATENT OFFICE 2,381,751

CARBURETOR

Scott F. Hunt, South Bend, Ind., assignor, by mesne assignments, to Bendix Stromberg Carburetor Company, a corporation of Illinois Application December 16, 1932, Serial No. 647,641

4 Claims. (Cl. 261—39)

This invention relates to control devices for carburetors, and has for its principal object the provision of an improved thermostat structure for operating the control valve of the carburetor to vary the richness of the fuel mixture as a function of engine temperature.

Internal combustion engines, which burn a mixture of liquid fuel and air, require a richer ratio of fuel to air when cold than when operating at normal operating temperature. Carburetors used to form such mixtures are provided with a control valve, usually an air regulating or so called choke valve, by which the richness of the mixture is regulated. Automatic regulation of the carburetor control valve has been achieved in the prior art, in the manner set forth in the copending applications of Hunt, Serial No. 534,795, filed May 4, 1931, now Patent 1,945,191, granted January 30, 1934, of which the instant application is a continuation in part, and Hunt and Olson, Serial No. 575,025, filed November 14, 1931.

In these prior art devices, a thermostat is employed to regulate the carburetor control valve, this thermostat being actuated by heat radiated from the exhaust manifold, which is rapidly heated to high temperature when the engine is running and is the hottest external part of the same. The use of the exhaust manifold as a source of heat renders available a wide temperature range, that is to say a great difference between the cold or non-operating temperature and the hot or operating temperature, with the result that an accurate regulation of the control valve is achieved. The exhaust manifold continues to grow hotter with continued operation of the engine after the critical temperature is reached and consequently the thermostat is subjected to temperatures in excess of the critical temperature required for the regulation of the control valve.

The present invention provides a thermostat structure capable of withstanding without damage the high temperatures to which it is subjected, a structure which may utilize for useful purpose the movement produced in it by heat in excess of that required for the normal actuation of the control valve.

My invention will be best understood from the detailed description and claims which follow, reference being had to the accompanying drawing in which a preferred embodiment of it is shown by way of example and in which:

Figure 1 is an elevational view, partly in section, showing the environment in which the invention is used;

Figure 2 is a view of the preferred form of the invention;

Figure 3 is a view of a modified form of thermostat;

Figure 4 is a view of another modification of the invention;

Figure 5 is a view of still another modification;

Figure 6 is a diagrammatic view showing an expansion type thermostat embodying the invention; and Figure 7 is a diagrammatic view showing the invention applied to a contraction type thermostat.

Referring now to the drawing in more detail, the carburetor 10 is provided with a mixture richness control valve shown as an air choke valve 12 located in the air inlet horn 14, this precise arrangement being capable of modification within the teachings of the present invention. Valve 12, which may be of the pressure responsive or unbalanced type is shown mounted upon a shaft 16 which is rotated to adjust the position of the valve and thereby regulate the richness of the mixture. A bimetallic thermostat 18 of spiral form is operatively connected to the shaft 16 and housed in a casing 20 which is supported by a suitable bracket 22 so as to position the thermostat 18 adjacent to the exhaust manifold 24 of the engine. Heat radiated from the manifold during the operation of the engine actuates the thermostat to control the richness of the mixture produced by the carburetor as a function of engine temperature. The thermostat is so designed that it coils more closely upon itself as it is heated, and is arranged to close the choke valve when the engine is cold and to permit the valve to open to its fullest extent when the engine is at normal operating temperature so as to produce a mixture meeting the requirements of the engine. The cold tension of the thermostat may be varied by rotation of the casing 20.

Thermostats are frequently constructed in the manner shown in Figure 3, that is to say, one end of a bimetallic heat responsive element 19 is connected to the shaft 16 and the other end is secured to the casing 20 in the manner indicated at 26. An arrangement of this kind is at a disadvantage when it is to be subjected to temperatures in excess of the critical temperature at which the element is to function to control the valve. Inasmuch as the valve is to be wide open at this critical temperature, it is necessary to design the element so that it will then have zero tension so that the valve may be fully opened by the air pressure to which it is subjected. As the temperature of the element 19 increases, negative tension will be built up in it since both of its ends are secured to relatively immovable objects. That is to say, if the thermostat is tensioned when cold to bias the valve toward its closed position, and to have zero tension at the critical temperature, movement produced in the element by exposure to temperatures above critical will tension the element to tend to open the valve, since one end of the element is fixed at 26 and the other end is fixed to the shaft 16 which is now immovable by reason of the engagement of the valve 12, or control mechanism associated therewith, with an open position stop. The tension built up in the element 19 serves only to distort the element, tending to cause it to buckle at maximum temperatures.

In its preferred form, the thermostat of my invention, shown in Figure 2, has an element 19 secured to the shaft 16 as before, and the free end of the element is formed as a hook 28. Casing 20 is provided with a suitable bracket 30 with which the hook 28 is engaged when the element is cold. Heating the element 19 first decreases the pressure exerted by hook 28 upon the bracket, this pressure becoming zero at the critical temperature. As the element is further heated hook 28 is backed away from the bracket, into the position shown in dotted lines, and because of this movement the element is not stressed or distorted.

In the modification shown in Figure 4 the movement of hook 28 away from bracket 30 is arrested by a second bracket 32, which is spaced some distance therefrom. The thermostat thus formed is tensioned, when cold, to bias the valve closed, has zero tension at the critical temperature and immediately above it, and is tensioned to bias the valve open when hook 28 is moved into engagement with bracket 32. The distance between brackets 30 and 32 governs the temperature range through which the element has no stress in either direction.

In Figure 5 I have shown a thermostat having a bimetallic element 36 which has one end fixed at 38 to a stationary bracket 40 and has the other end fixed to a rotatable shaft 42 which is journalled in the bracket. Bracket 40 is secured to and locates the element 36 alongside the exhaust manifold 44 as before. Shaft 42 carries a cam 46 having a concentric surface 48 and eccentric surfaces 50 and 52. Valve shaft 16 is provided with a stirrup like bracket 54 fixed thereon by convenient means such as the clamping screw 55. A lever 56 is loosely mounted upon the shaft 16 and carries a roller 58 adapted to engage the surfaces 48, 50 and 52 of the cam. A spring 60 is secured to lever 56, wound around the shaft and hooked over bracket 54.

When thermostat 36 is cold the cam and lever are in the position shown in Figure 5. Heating the thermostat causes it to rotate shaft 42 and cam 46 in a clockwise direction. Roller 58 rides over surface 50 and lever 56 is moved in a clockwise direction around shaft 16. The edge of the lever engages a shoulder on bracket 54 and shaft 16 is rotated by this movement. As soon as roller 58 contacts the concentric surface 48 movement of the cam is ineffective to further rotate the lever 56. As thermostat 36 is cooled cam 46 is rotated in the oposite direction. Roller 58 engages surface 52 and lever 56 is forced through a counterclockwise movement around shaft 16. The initial portion of this movement raises the edge of the lever off of the shoulder on bracket 54, with which it is shown engaged, against the tension of spring 60 into engagement with the opposite shoulder on the bracket. Further movement of the lever rotates shaft 16 to close the valve 12, and the valve is locked closed by the engagement of roller 58 with surfaces 50 and 52.

The cam 46 may be provided with a second cam surface 49 which extends outwardly from the concentric surface 48 which is moved into engagement with a control lever 57 as cam 46 is rotated in a clockwise direction. The lever 57 may thus be operated, when the exhaust manifold 44 exceeds a safe operating temperature, to control either the carburetor or the cooling system of the engine, to prevent damage from overheating. A spring 59 serves to keep lever 57 in engagement with the cam 46.

In Figure 6 I have shown an expansion type thermostat 62, which may be a bellows of known construction, and is anchored at 64. The free end of the bellows is provided with a suitable link 66 which engages the control lever 68 of a valve 70. As the bellows expands responsive to an application of heat thereto, link 66 moves to the left, Figure 6, permitting the valve 70 to open. When the valve is fully opened, lever 68 engages a suitable stop 72 to prevent further movement of the valve, lever 66 then is in the position shown by dotted lines 73. Further expansion of bellows 62 moves lever 66 away from lever 68 into the position shown by dotted lines 74.

In Figure 7 I have shown the invention applied to a bellows thermostat which contracts upon being heated. Thermostats of this type are known, being shown in Figure 6 of the Patent 1,679,999, issued to C. E. Williams on August 7, 1928. The bellows 76 is anchored at 78 and provided with a link 80 which engages the control lever 82 of a valve 84. As the bellows is heated link 80 moves to the left, Figure 7, permitting the valve to open, until lever 82 engages the stop 86 to prevent further movement of the valve. Further contraction of the bellows moves link 80 away from the lever 82, as indicated by the dotted lines 87.

While I have illustrated my invention by showing a preferred embodiment of it, I am not to be limited by the details shown by way of example as I am aware of many modifications that can be made within the teachings of the invention.

I claim:

1. The combination with a carburetor choke valve having a shaft, of a thermostat element connected to said shaft and tensioned when cold to rotate the shaft in one direction, said element being arranged to reduce said tension to zero when heated to within a predetermined range of temperature, and means cooperating with the element and becoming operative only when said range is exceeded for tensioning the same to rotate the shaft in the opposite direction.

2. The combination with a carburetor having an unbalanced choke valve, of a thermostat, means including an actuating connection between the thermostat and the valve for transmitting force from the thermostat to the valve to rotate the latter in one direction when the thermostat is cold and in the other direction when the thermostat is hot, and a lost motion device in said connection permitting the choke valve to move through a limited range independently of the thermostat.

3. A control for a carburetor choke valve responsive to air flow in the carburetor, comprising a relatively fixed member, and temperature responsive means connecting the fixed member to the valve for rotating the valve in one direction upon a drop in temperature and in the other direction upon a rise in temperature, said means including a lost motion device permitting a limited amount of free movement of the valve.

4. A carburetor mixture control device comprising a casing, a pair of stop members secured to the casing and spaced apart from each other, a shaft journalled in the casing, a bimetallic element fixed to and wound around said shaft and arranged to unwind upon a drop in temperature, and means on said element for bearing against one of said stop members when the element is cold and against the other stop member when the element is hot to permit the element to exert torque upon the shaft in opposite directions.

SCOTT F. HUNT.